Dec. 6, 1949     J. H. VAN UUM ET AL     2,490,663
WALL PANEL SECURING MEANS

Filed July 23, 1945     7 Sheets-Sheet 1

INVENTORS.
JOHN H. VAN UUM,
BERNARD EMMING
AND CLARENCE LOHR.

Dec. 6, 1949   J. H. VAN UUM ET AL   2,490,663
WALL PANEL SECURING MEANS
Filed July 23, 1945   7 Sheets-Sheet 2
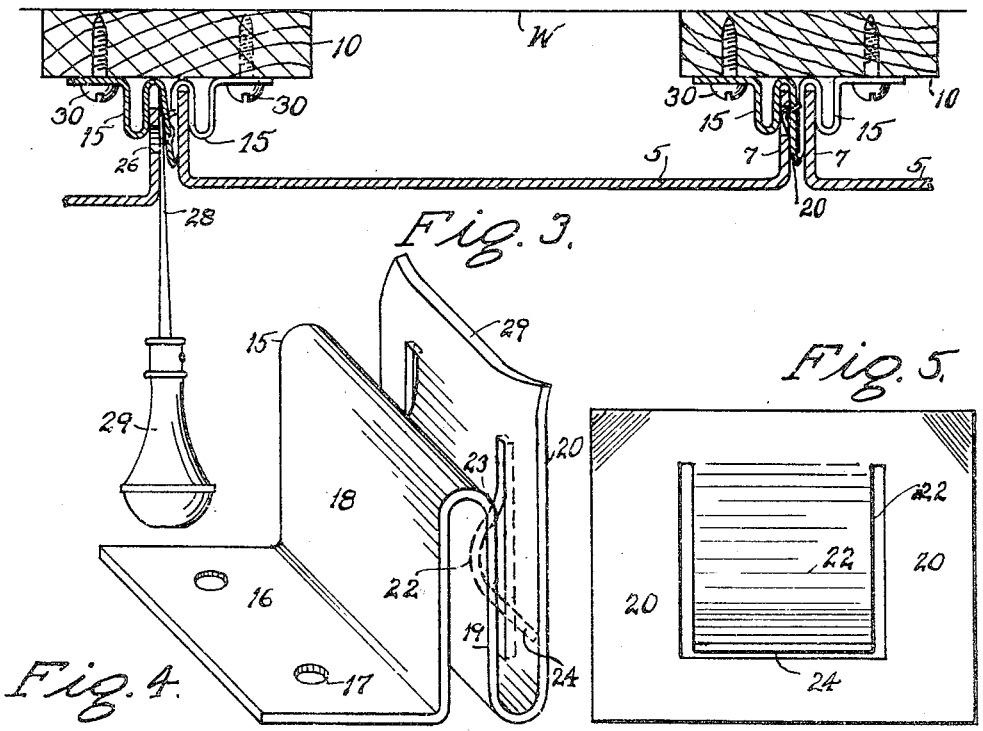
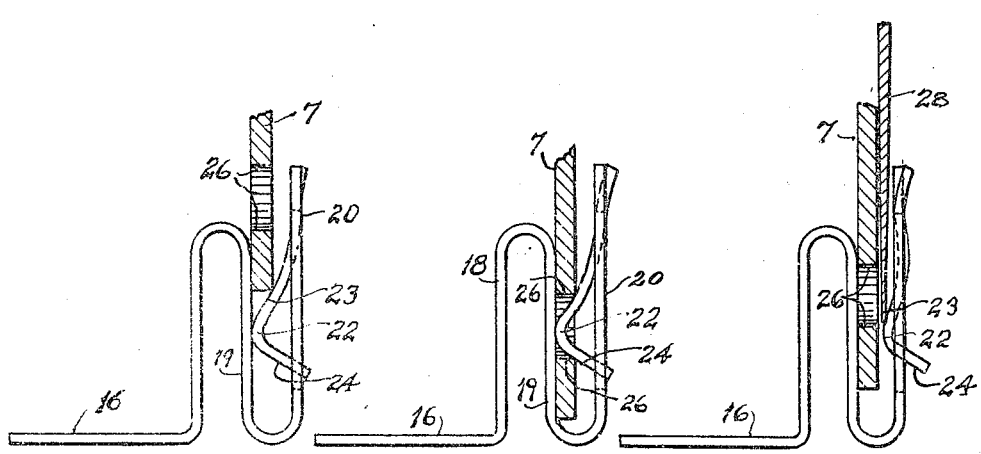
INVENTORS.
JOHN H. VAN UUM,
BERNARD EMMING,
AND CLARENCE LOHR.
BY Justin W. Macklin
atty

INVENTORS.
JOHN H. VAN UUM,
BERNARD EMMING
AND CLEARENCE LOHR

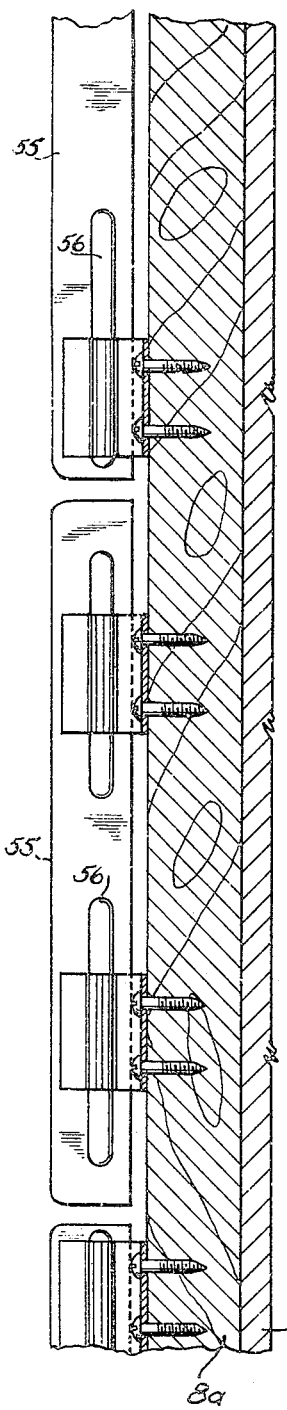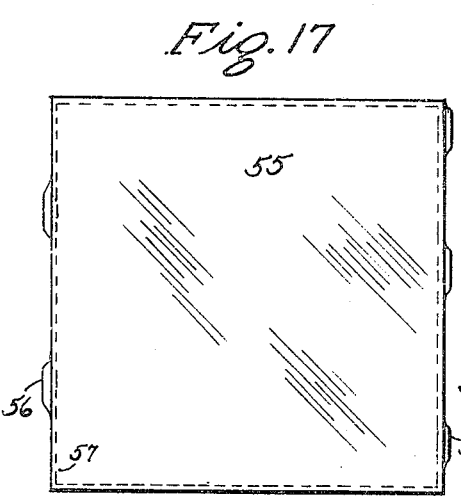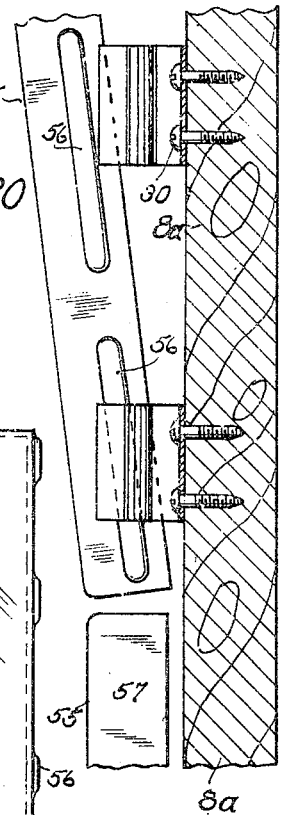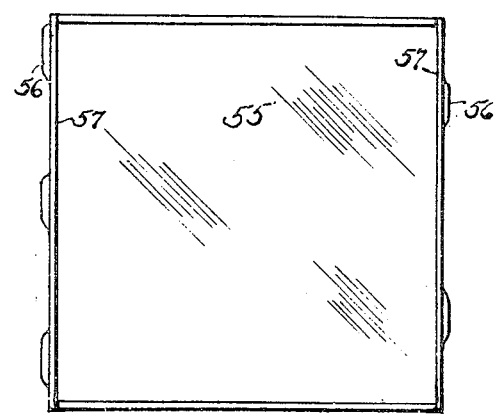

Dec. 6, 1949 J. H. VAN UUM ET AL 2,490,663
WALL PANEL SECURING MEANS
Filed July 23, 1945 7 Sheets-Sheet 5
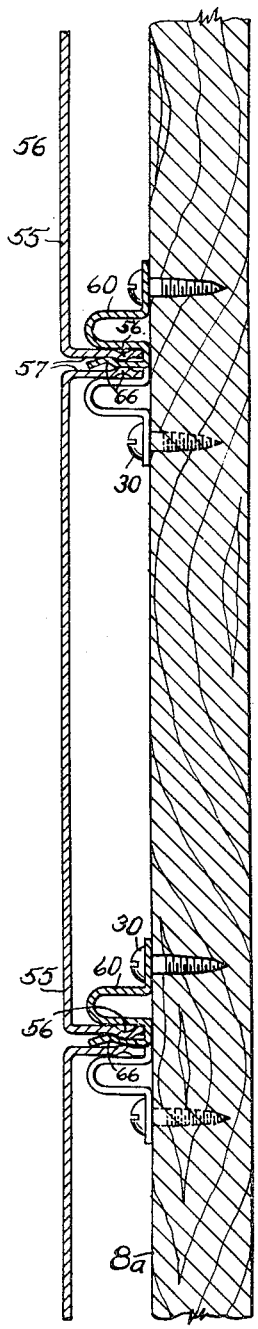
Fig. 21
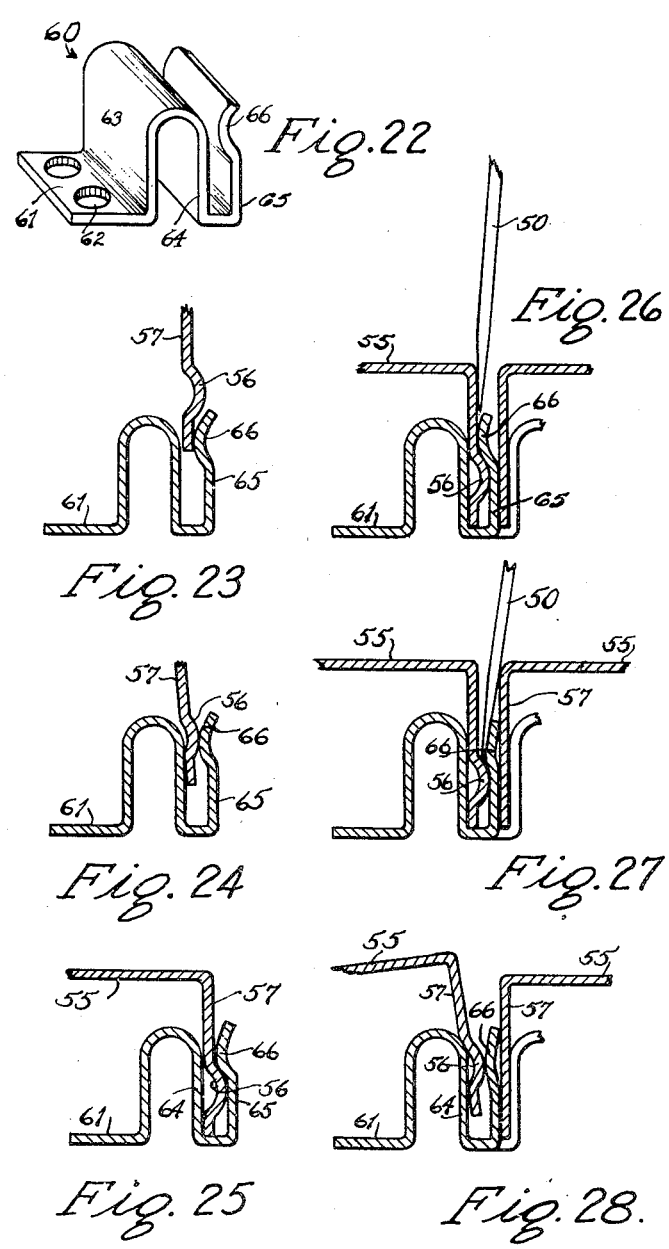
INVENTORS.
JOHN H. VAN UUM,
BERNARD EMMING
AND CLARENCE LOHR Dec. 6, 1949     J. H. VAN UUM ET AL     2,490,663
WALL PANEL SECURING MEANS
Filed July 23, 1945     7 Sheets-Sheet 7

INVENTORS.
JOHN H. VAN UUM,
BERNARD EMMING
AND CLARENCE LOHR

Patented Dec. 6, 1949

2,490,663

UNITED STATES PATENT OFFICE 2,490,663

WALL PANEL SECURING MEANS

John H. Van Uum, Cleveland, Bernard Emming, Fairview Village, and Clarence Lohr, Cleveland, Ohio, assignors to The Cuyahoga Spring Company, a corporation of Ohio Application July 23, 1945, Serial No. 606,530

6 Claims. (Cl. 189—88)

This invention has for its objects the provision of simple, efficient easily manufactured fastening device and the provision of cooperating elements on flanges for sides of metal panels and by which the panels may be securely held in position and yet may be readily removed by the use of a simple tool.

In the mounting of finished and decorative panels formed of metal and carrying vitrolite enamel or other like finish suitable for bathrooms, kitchens, store front exteriors and the like, it has long been the practice to apply the desired finish to the exterior or outer side of a flanged metal rectangular member. For example the panels may carry a tile, marble or terra cotta finish.

It has afforded a considerable problem to secure such panel members to the under surface or carrying elements thereon without defacing the finish. It is also frequently desired to remove one or more panels, and heretofore the fastening means used has rendered this difficult and frequently results in defacing or destruction of the panel, precluding its being put back into place.

In the arranging of such panels, it is frequently the practice to space them closely, fill in with a plastic substance corresponding to cement or mortar which gives the desired appearance and presents a waterproof surface. If such spacing or filling is made wide enough to use fastening means such as screws between the panels and to allow excess thereto, the filling material is too wide, an excessive amount is required, and the artistic appearance is lost.

Further objects of the present invention include the provision of spring clip fastening devices which permit the panel faces to be closely positioned with a narrow space between them so arranged that the fastening means are invisible or concealed when the filler is applied between the panels.

Another important object is that upon removal of the filler and with the use of a simple tool, of the nature of a putty knife or screw driver, the clips may be disengaged from the panel allowing it to be removed easily and without any defacement or injury. The clip fastening devices are secured in proper aligned position and receive the flanges coacting with shoulders, offset surfaces or openings, as the case may be, and it is desirable that they act to hold the panel tightly by exerting a constant tension thereon, urging the panel inwardly at all times.

Other advantages will become apparent in the following description which refers to a preferred embodiment, modifications of which are also described. It is to be understood other modifications may be made within the spirit and scope of the present invention.

In the drawings, Fig. 1 is a face view of a wall in the nature of store front to which panels are applied in accordance with this invention.

Fig. 3 is a horizontal section of a panel showing a portion of an adjacent panel which is being detached for removal.

Fig. 4 is a perspective view of one of the securing clips.

Fig. 5 is a face elevation of the same.

Fig. 6 is a side elevation showing the flange at the moment of entering engagement.

Fig. 7 shows the engaging and permanently held position.

Fig. 8 is a similar view showing the method of disengaging the clip from the flange.

Figs. 17 and 18 are face and rear views of the panel showing the ribs or projections on the flanges for the modified form of fastener.

Fig. 19 is a vertical section through the wall furring strip, showing adjacent panels in position.

Fig. 20 is a similar view showing one of the panels being removed.

Fig. 21 is a vertical section similar to Fig. 10, showing a slightly modified form of clip and flange.

Fig. 22 is a perspective view of the clip of this form, on a scale enlarged over that of Fig. 21.

Figs. 23, 24 and 25 show the flange of the panel entering the clip and in its final securing position.

Figs. 26, 27 and 28 show the disengaging of the panel flange and clip for removal.

Figs. 29 to 35 show the use of a modified form of our invention, and of which Fig. 29 is an elevation of a bathroom wall fitted with tile panels.

Fig. 30 is an enlarged detail of the same, partly in section.

Fig. 31 is a horizontal section through adjacent panels and the securing devices.

Fig. 32 is a perspective view of the double fastener, shown in Fig. 31.

Figs. 33, 34 and 35 are sections through such a fastener, showing different positions of the coacting panel flange.

Figure 1:
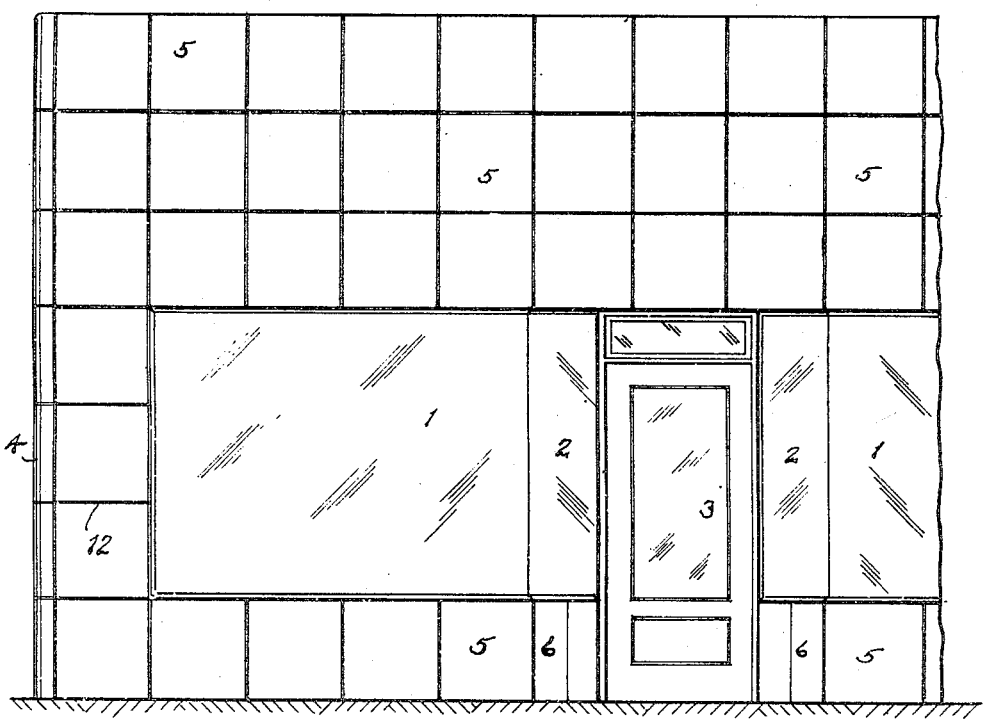

Among the many uses in which the advantages of our invention may be utilized is for decorative exterior walls, an example of which is the store front illustrated in Fig. 1.

In Fig. 1, the tile or facing block effect around large display windows, 1 and 2, of a store front are shown as rectangular, preferably square panels 5. Converging entrance effect of display windows 2—2 lead to a door indicated at 3 and below the glass 2 are similar panels indicated at 6. These may be of the same form, but wider or narrower panels may be used if dimension limitations require them. A suitable finish or corner closure may be provided, carrying out the block effect as indicated at 4 at the left of Figs. 1 and 2.

Figure 2:
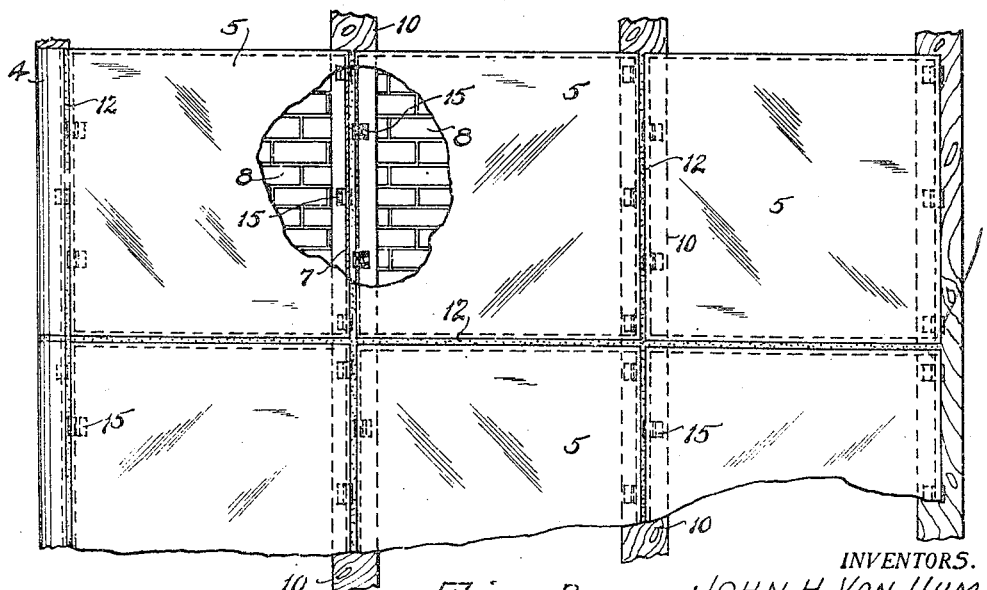
Fig. 2 is an enlarged face view, partly in section, showing panels and the securing means.

The wall proper may be of any common construction. In Fig. 2 brick 8 are shown, to which are secured furring strips 10 to which our fastener clips 15 are attached and positioned to engage the adjacent flange 7 of the aligned panels 5.

The outer surfaces of these panels 5 may be finished for any desired effect. Usually vitrolite enamel or some ceramic material or paint is used which may be very durable, but many of these materials are subject to cracking or defacement if the panels are subjected to bending, pounding or any treatment likely to distort the plane of the panel.

Furthermore, the panels must be held very firmly and, as stated, it is necessary to position them without excessive pounding or application of localized pressure.

One form of snap fastener securing clip made according to our invention is illustrated particularly in Figs. 3 to 8. The fastening device per se, designated 15, is formed from a flat metal strip of suitable spring stock, preferably, for example ¾ of an inch wide and approximately .025 inch in thickness. The clip is formed with a flat base portion 16 provided with punched holes 17 for receiving securing screws indicated at 30 (Fig. 3). From one side of the base portion the strip is bent to form a spaced fold 18, one side of which extends downwardly as at 19 and from which the strip is turned upwardly in spaced position and parallel with the section 19, as indicated at 20. The portion 20 is punched to form a tongue 22 which is bent to present a sloping surface 23 extending downwardly and toward the wall 19 and is formed with a return bend presenting an outwardly sloping surface 24. In the flanges 7 of the panels, slots 26 are formed preferably substantially longer than the width of the securing clips, so that engagement of the tongue 22 is assured, allowing for some variation in the relative positions of the clips on the furring strips 10. The inwardly projecting hump of the tongue 22 extends into these slots 26, as shown in Fig. 7, and the more abrupt slope of the portion 24 bearing against the lower edge of the slot tends to exert a constant downward pressure, holding the panels firmly in position and likewise effecting a secure locking engagement.

The arrangement described, further, provides for an exceptionally simple and convenient method of disengaging the securing means for removing the panels. A thin edged tool, indicated at 28 (Fig. 8), which may be in the nature of a thin screw driver or putty knife, having a handle 29 (Fig. 3) is thrust downwardly between the upward extension 20 of the securing clip and the panel flange 7, forcing the tongue 22 out of the slot 26 whereupon the panel may be lifted, sliding its flange 7 upwardly, the start of which movement is indicated in Fig. 8.

The insertion of the panel flanges requires no such action, but needs only to have the flanges pressed against the more gradual slop 23 of the tongue 22, and be forced downwardly from the position shown in Fig. 6 to that of Fig. 7.

To facilitate inserting the tool or blade 28 between the flange 7 and the clip portion 20, the upper edge of the portion 20 may be turned outwardly either in the mid portion or at its corners. The desired shape or form may be given it when the tongue 22 is severed from the spring portion 20 and formed, as shown in Figs. 4 and 5.

The sections such as Figs. 3, 11, 12 and 13 show the mid-portion of the upward extension bowed outwardly slightly to receive the tool such as 28. Figs. 4 and 8 indicate outward turning of the corners of the upward extension.

The mounting of the clips on the furring strips 10 may be done either before or after the strips are in position on the wall, and the clips are preferably staggered to alternately extend each way from the line between the panels. They may be positioned by suitable markings or may be assembled against a straight edge to position them for engagement with the slots 26. The offsetting avoids these clips abutting each other, and also permits the flanges and thus the sides of the panels to be brought closely together.

The space between the panels is preferably filled with plastic material, which may be putty or the like, as indicated at 12. Thus, to remove the panels, the material between them need only be picked or chipped out over the fastening devices to permit the insertion of the tool blade for retracting the holding tongue 22.

To remove a panel from the body of the wall without disturbing others is also possible with this arrangement and other modifications herein described. A simple method is to insert a hook or like instrument below the edge of the flange as it is released. The two or more fasteners on one side of the panel should be released at the same time, after which the fasteners on the opposite side may be released and the panel may be lifted clear.

Figure 9:
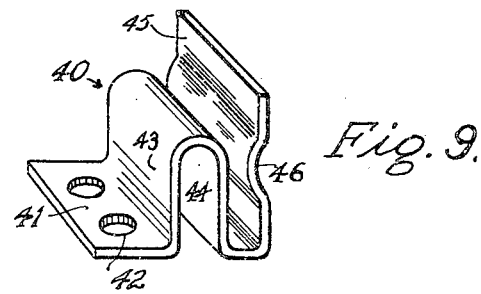
Fig. 9 is a perspective view of the modified form of the fastener clip.

In the form shown in Figs. 10 to 16, the panels 35 may be square or oblong rectangles having flanges 37 corresponding to the flanges 7 of the panels 5, except that in forming flanges they are provided with depressed grooves 36 substantially longer than the width of the securing clip 40 (Fig. 9).

The fastening device of Fig. 9 is folded from a similar strip of spring steel or other material and is of substantially the same contour as the fastener 15.

As shown, it has a flat base portion 41 provided with screw openings 42 and an upward and downward fold 43—44, the latter extending upwardly again parallel with the portion 44 as at 45, and shown as having a rib or bead 46 adapted to fit into the groove 36 in the flange.

The upper edge of the portion 45 may be bowed outwardly, as indicated at 49, to permit the insertion of a blade or tool such as a screw driver, indicated at 50.

Figure 11:
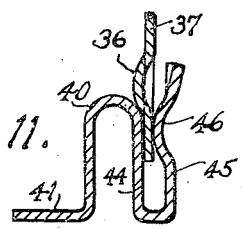
Figs. 11, 12 and 13 show the entering and final engaging positions of flange and panel.
Figure 12:
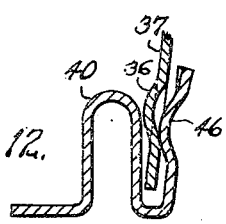
Figure 13:
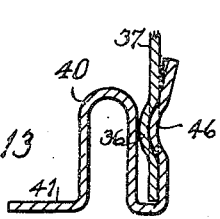

The insertion of the flange to mount the panels is shown progressively in Figs. 11 to 13, in which the portion 45 with its bulge or bead 46 is shown in Fig. 12 as yielding outwardly to the right, and in Fig. 13 the bead is shown engaging the groove or depression 36 in the flange in the securing and holding position.

Figure 14:
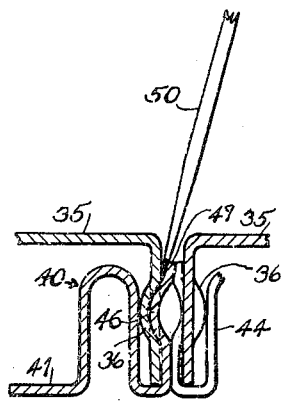
Figs. 14, 15 and 16 are sectional views illustrating the disengaging and removal.
Figure 15:
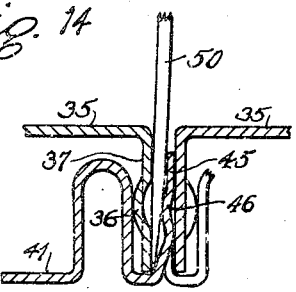
Figure 16:
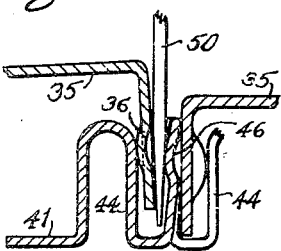

In Figs. 14 to 16 the point of an ordinary screw driver 50 is shown as being inserted between the element 45 and the flange 37 to disengage the bulge 46 from the groove 36 in the panel. In Fig. 16 the lifting or raising movement of the flange and panel is shown in the position just before the flange is freed from the fastener.

In Figs. 19 to 28 a modified form of the fastening device is similar to that shown in Fig. 9 and is arranged to engage outwardly projecting ribs or beads 56 on the panels 55 (Figs. 17 and 18).

Figure 10:
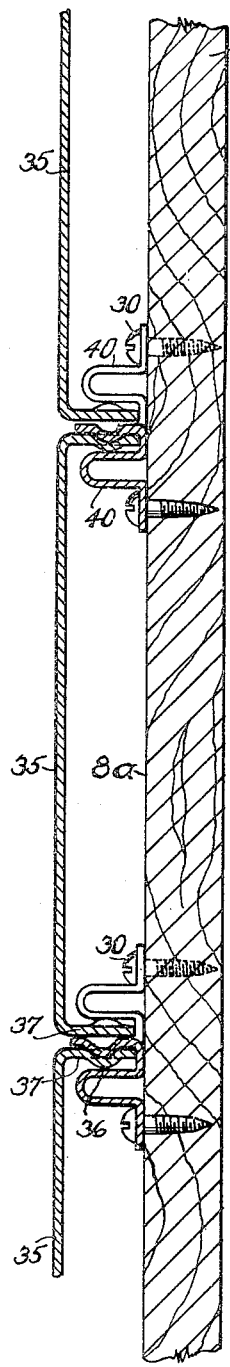
Fig. 10 is a vertical section through a panel and portions of two adjacent panels and their securing means.

In Figs. 10, 19 and 21 the securing devices are shown as screwed directly to the wall member 8a, which may be a board surface or may be separated furring strips 10 secured on any suitable wall W (Fig. 19).

Referring to Fig. 22 the securing device 60 is shown as having a base portion 61, screw holes 62, parallel loop portion 63 and 64 and upright spring end 65, as before. The bulge or bead 66 corresponding to the bulge 46 is higher, being near the upper end of the portion 65, whereby it may ride over and engage above the bead 56 on the flanges 57 of the panels 55. The extension appearing in this figure above the bead 66 may be short, or omitted as appears in the subsequent figures.

In Figs. 23 to 24 is illustrated the insertion of the flange into engaging position. Fig. 25 shows the overlapping and locking position of the projecting elements 56 and 66 and represents the final locking position. The continued spring action of the member 65 urges the bulge 66 into engagement with the sloping upper side of the bead 56, thus constantly exerting downward pressure to hold the panels firmly in place.

The removal of a panel may be effected as before by inserting a screw driver 50 to release the holding engagement, as shown in Figs. 26 to 28, corresponding to Figs. 14 to 16.

Figure 29:
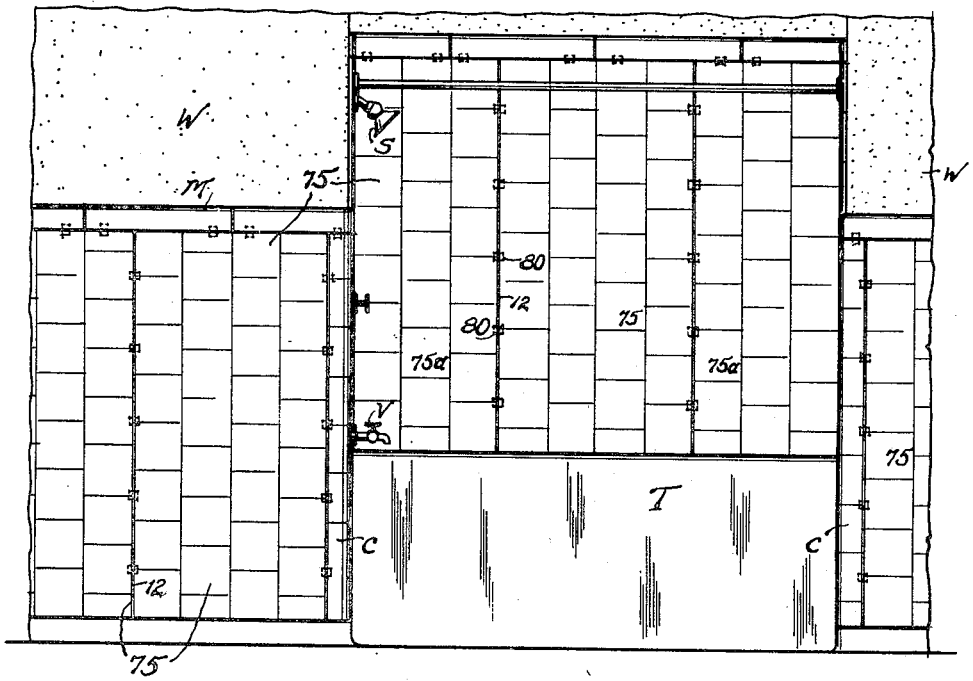

The bathroom of Fig. 29 has the wall, generally designated W covered with panels 75, shown as marked in imitation tile block, the spaces between them being filled by putty or other filler 12 of appropriate color. The panels may vary in width to suit dimensions of wall offsets, bathtub nitch, etc., for example, the panels 75a, being shown as narrower than the center panel back of the tub T. Suitable trim molding, indicated at M may be used at the top of the panels and shown as meeting the wall surface.

The modified form of fastener indicated at 80 may be used for exterior walls, such as shown in Fig. 1, as well as for other uses.

Figure 30:
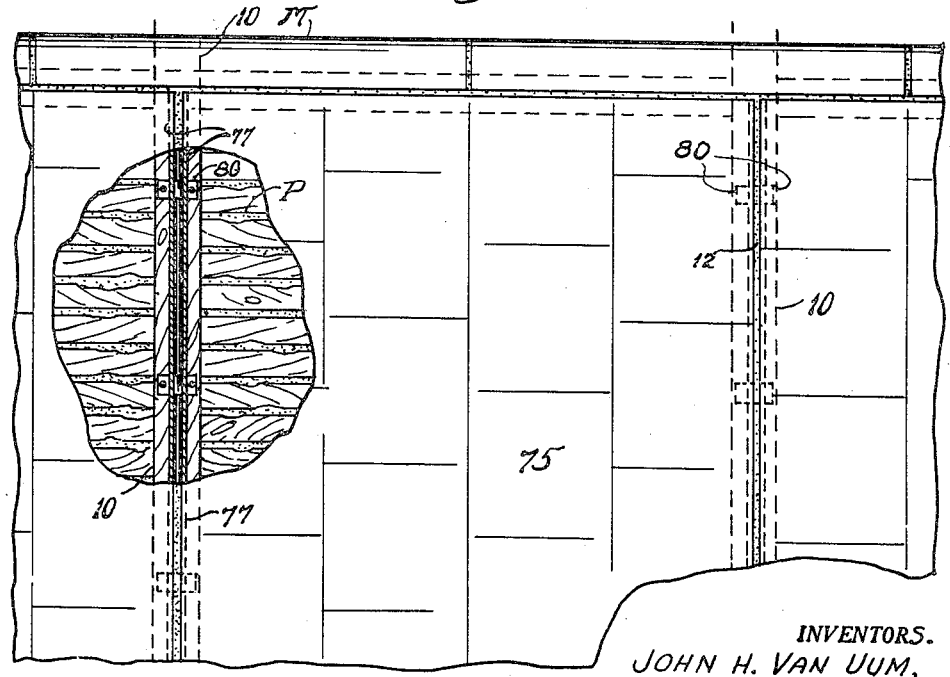

Fig. 30 shows a lath and plaster wall finish at P. Furring strips 10 may be set into the wall as before and to which the snap fastener devices 80 or any of these described herein may be attached and positioned to embrace and secure inturned flanges 77 of the panels 75.

Figure 32:
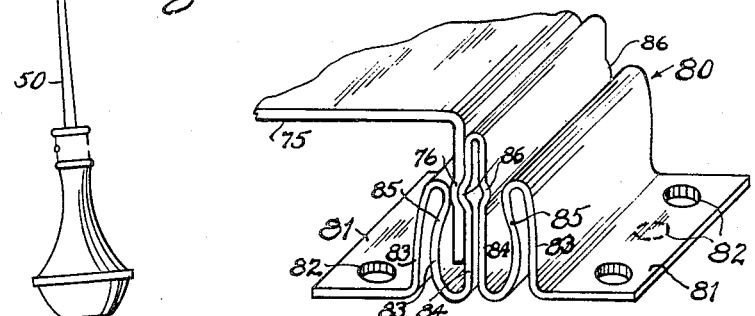

Referring particularly to Fig. 32, this double fastener device 80 is adapted to engage two adjacent flanges 77, and is preferably made from a similar strip of spring steel, such as that described, that is, having approximately the width and thickness used in the other fasteners, 15, 40 and 60, although, if desired, because of its effective gripping action, it may be slightly lighter gauge metal.

Referring particularly to Fig. 32, the ends of the strip are shown as forming flat base portions 81 in which one or two screw holes 82 are punched. The strip is bent intermediately to form parallel spring portions having outwardly pressed beads or bulges 86, and extending downwardly as indicated at 84, and then turned upwardly into the approximately parallel folds at either side of the central fold, as shown at 85 and 83. The outer reaches 83 of the latter folds are bent outwardly to form the base members 81.

Figure 31:
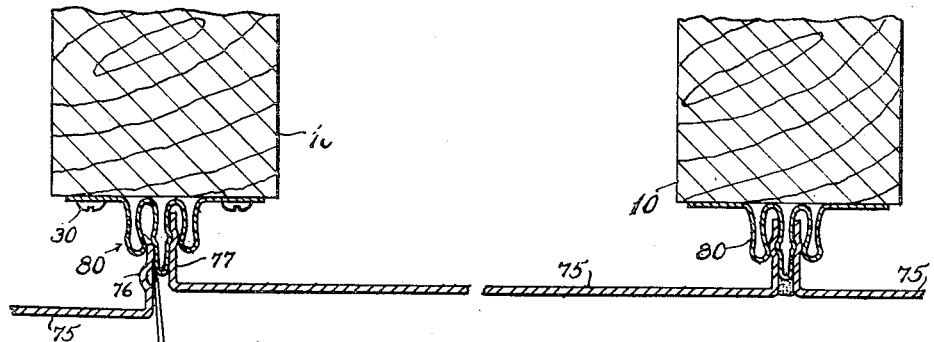
Figures 33, 34:
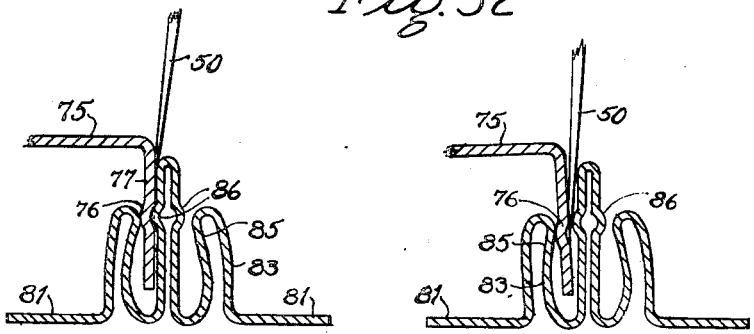
Figure 35:
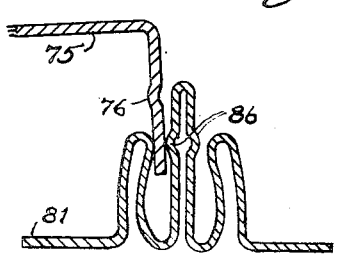

The upper portions of the folds 83—85 are shaped to press inwardly to grip a flange groove 76 between each of the beads 86 and the adjacent folded portions, as shown in Figs. 31, 32 and 33. Here again the removal of a panel may be effected by inserting a screw driver or like blade, disengaging the beads 86 and grooves 76, as shown in Fig. 34, whereupon the panel may be lifted and withdrawn from its engagement, as indicated in Fig. 35.

Because the strip is formed all on one piece, one screw on either side may effectively hold the securing devices 80 instead of the two screws through the base portions of the clips 15, 40 and 60.

Having thus described our invention, what we claim is:

1. The combination of wall panels having a finished surface and flanges turned away from the finished surface, and adapted to be arranged to cover a wall except for slight spacing therebetween, and securing members fixed to the wall in predetermined positions to engage the flanges of the panels when in position, the securing members each comprising flat strip metal bent to form a loop to engage the inside surface of a flange, and presenting a loop extending across the edge of the flange and engaging the outer surface, and having a sloping locking surface formed on one of the flange engaging portions, and a locking shoulder formed on the flange coacting with the sloping surface whereby spring tension toward the flange tends to firmly hold the panel.

2. The combination of wall panels having flanges and securing means fixed to the wall in predetermined positions to engage the flanges of the panels when in closely spaced positions, the securing means comprising flat strip members, each bent to form a loop to engage the one surface of a flange and also extending below the edge of the flange and engaging its other surface and having a locking shoulder and shoulders formed on the flanges each coacting with one of said locking shoulders whereby spring tension toward the flange wedges the shoulder surfaces together.

3. The combination with wall panels adapted to fit a pattern to cover a wall surface and having outer finished surfaces and inturned flanges, elongated shoulders formed on the flanges, of a series of aligned fastening devices secured to the wall adapted to embrace the flanges and interlock with said shoulders to secure the panels in position, said fasteners comprising spring members formed from flat strip stock, each having a base fitted against the wall and from which the material extends outwardly and back toward the wall in a return bend, and then outwardly again forming a spring pressing end section between which and the inner side of said return bend the flange of the panel may be received, and a projection formed on the fastener extending above and engaging an elongated shoulder on the flange.

4. A plurality of metal panels having outer finished surfaces and inwardly turned flanges, furring strips on the wall and flange engaging members secured to the furring strips for holding the panels in position, each of said members comprising a single strip of flat spring metal having flat ends fitted against and secured to a furring strip, and having an intermediate narrow loop rising between the flanges, and having adjacent loops adapted to press against the inner sides of said flanges, said loops and flanges having coacting shoulders parallel with the wall.

5. A plurality of metal panels having outer finished surfaces and inwardly turned flanges, flange engaging members attached to the wall for securing the panels in position, each said member comprising a single strip of flat spring metal having its ends secured to the wall, and having an intermediate narrow loop rising between adjacent flanges, and having a loop at each side of the intermediate loop adapted to press against the inner side of one of the flanges, said loops and flanges having coacting shoulders held in spring pressed engagement.

6. The combination of wall panels, each having a finished surface and flanges turned away from the finished surface, and fastening devices adapted to engage the panel flanges and each device comprising a flat strip of spring material having a base portion with a screw opening and from which the strip material extends outwardly and is then folded inwardly upon itself and is bent again outwardly to form a flange receiving loop, a latching projection formed upon the latter outward extension, and elongated shoulders formed on the flanges and adapted to engage beneath said projection.

JOHN H. VAN UUM.
BERNARD EMMING.
CLARENCE LOHR.

REFERENCES CITED

The following references are of record in the file of this patent:

UNITED STATES PATENTS

| Number | Name | Date |
|---|---|---|
| 1,965,282 | Ellithorpe et al. | July 3, 1934 |
| 1,997,607 | Strom | Apr. 16, 1935 |
| 2,005,994 | Hohl | June 25, 1935 |
| 2,020,585 | Stansberry | Nov. 12, 1935 |
| 2,205,700 | Smith | June 25, 1940 |
| 2,206,201 | Plym | July 2, 1940 |
| 2,328,757 | Tinnerman | Sept. 7, 1943 |
| 2,379,269 | Barrows | June 26, 1945 |